E. F. HOFMANN.
Pessary.

No. 98,769.

Patented Jan. 11, 1870.

Witnesses:
C Wahlers
E. F. Kastenhuber

Inventor:
E. F. Hofmann
per
Von Sandwoord & Stauff
Atty

United States Patent Office.

ERNST F. HOFMANN, OF NEW YORK, N. Y.

Letters Patent No. 98,769, dated January 11, 1870.

IMPROVED PESSARY.

The Schedule referred to in these Letters Patent and making part of the same

*To all whom it may concern:*

Be it known that I, ERNST F. HOFMANN, of the city, county, and State of New York, have invented a new and useful Improvement in Pessaries; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
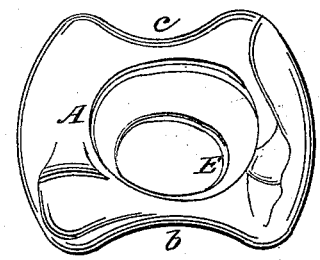
Figure 1 is a top view of a pessary, containing my invention.
Figure 2:
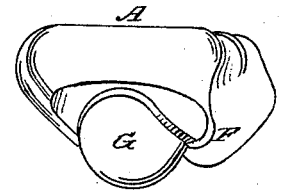
Figure 2 is a partial under-side view.
Figure 3:
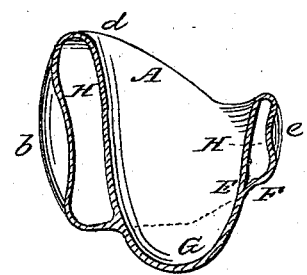
Figure 3 is a transverse section, in the line $x\ x$ of fig. 1.

My invention is an improvement on the device for which Letters Patent have been previously granted to me, and consists in combining, with said device, a sac or covering over the bottom thereof.

The letter A designates the pessary in all three figures. Its walls are double, so as to enclose a hollow space, H, which I fill with air, at such pressure as I desire, sufficient to maintain the pessary in proper shape under the pressure of the atmosphere or external air; or, if desired, the pessary may be made solid, and of any suitable material.

Below the anterior edge of the pessary, I make the surface recede backward, as shown at F, so as to allow the anterior wall of the vagina to approximate the posterior wall almost immediately in front of the pessary, and thus facilitate the parts taking a natural position after the pessary is in place.

The concave surfaces are represented at $b\ c$, and the elevation at $d$.

All these features were secured in my former patent, and I do not now claim them.

In order to apply my pessary, in the treatment of ulceration of the uterus, inflammation, &c., I combine therewith a covering or sac, G, arranged about or around the mouth or the bottom of the opening E. This covering or sac forms an extension of the sides of the opening, and I make it of thin, flexible material, such, for example, as thin India rubber, and it constitutes a small sac, which can be filled with cotton, sponge, or other porous or absorbent material, saturated with the proper remedial agent, or the sac may be filled with any ointment or liquid which it is desired to apply to the uterus.

If it is required to apply a remedy in liquid form, I first apply the pessary, and then, by means of a uterine syringe, whose point has been bent to a suitable angle, inject the liquid into the sac.

This portion of my invention enables the physician to make local applications with good effect, without injury to the neighboring parts.

What I claim as new, and desire to secure by Letters Patent, is—

The pessary, consisting of the parts $b\ c\ d$, in combination with the sac or covering over the bottom, substantially as and for the purpose described.

This specification signed by me, this 31st day of August, 1869.

ERNST F. HOFMANN.

Witnesses:
 W. HAUFF,
 E. F. KASTENHUBER.